US 8,708,070 B2

(12) United States Patent
Tsuchida et al.

(10) Patent No.: US 8,708,070 B2
(45) Date of Patent: Apr. 29, 2014

(54) POWER TRANSMITTING APPARATUS AND POWER TRANSMITTING APPARATUS ASSEMBLY METHOD

(75) Inventors: Michitaka Tsuchida, Susono-shi (JP);
Hiroyuki Shioiri, Numazu (JP);
Hideaki Komada, Gotenba (JP);
Makoto Taniguchi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 552 days.

(21) Appl. No.: 12/922,286

(22) PCT Filed: Aug. 5, 2009

(86) PCT No.: PCT/IB2009/006452
§ 371 (c)(1),
(2), (4) Date: Sep. 13, 2010

(87) PCT Pub. No.: WO2010/015914
PCT Pub. Date: Feb. 11, 2010

(65) Prior Publication Data
US 2011/0113782 A1    May 19, 2011

(30) Foreign Application Priority Data
Aug. 7, 2008    (JP) ................................. 2008-204809

(51) Int. Cl.
*B60K 6/42*    (2007.10)
(52) U.S. Cl.
USPC ................................. 180/65.22; 123/196 R
(58) Field of Classification Search
USPC ................... 180/65.22, 65.225; 184/26, 27.1;
123/196 R, 196 W
See application file for complete search history.

(56) References Cited

U.S. PATENT DOCUMENTS 5,993,169 A * 11/1999 Adachi et al. ................. 417/223
7,081,060 B2 * 7/2006 Hata et al. ........................ 475/5
(Continued)

FOREIGN PATENT DOCUMENTS

CN    101626914 A    1/2010
DE    102 27 314 A1    1/2004
(Continued)

OTHER PUBLICATIONS

International Search Report issued in Application NO. PCT/IB2009/006452; Dated Nov. 12, 2009.

(Continued)

*Primary Examiner* — J. Allen Shriver, II
*Assistant Examiner* — Travis Coolman
(74) *Attorney, Agent, or Firm* — Oliff PLC (57) ABSTRACT

A power transmitting apparatus is provided with an electric motor shaft that is connected to a rotor of an electric motor, an input shaft arranged parallel to the electric motor shaft and transmits power to and from an internal combustion engine positioned on one side in the axial direction, an input shaft rotating member provided on an end portion of the input shaft that is on the side opposite the internal combustion engine side and transmitting at least one of the power from the input shaft or the power from the electric motor shaft to a drive shaft of a vehicle, and a pump driven by the power from the internal combustion engine and pumps lubrication oil, and the electric motor is arranged on the opposite side of the input shaft rotating member from the internal combustion engine in the axial direction. The input shaft rotating member is rotatably supported by the case via a bearing, and at least part of the pump is arranged radially inward of the bearing.

7 Claims, 5 Drawing Sheets

(56) References Cited

U.S. PATENT DOCUMENTS

| | | |
|---|---|---|
| 8,251,675 B2 * | 8/2012 | Tryon et al. .................... 417/364 |
| 2005/0139401 A1 * | 6/2005 | Fujioka ........................ 180/65.2 |
| 2007/0265129 A1 | 11/2007 | Kasuya et al. |
| 2007/0286757 A1 | 12/2007 | Barthel et al. |
| 2008/0121446 A1 | 5/2008 | Sanji |
| 2009/0023529 A1 * | 1/2009 | Sanji et al. ........................ 475/5 |
| 2010/0120569 A1 | 5/2010 | Sanji et al. |

FOREIGN PATENT DOCUMENTS

| | | | |
|---|---|---|---|
| DE | 10 2006 026 631 A1 | 12/2007 | |
| DE | 11 2008 000 534 T5 | 12/2009 | |
| EP | 1 223 067 A2 | 7/2002 | |
| JP | A-08-200223 | 8/1996 | |
| JP | 200335263 A * | 12/2000 | ............ B60K 17/04 |
| JP | A-2002-274201 | 9/2002 | |
| JP | A-2009-107491 | 5/2009 | |
| WO | WO 2009/011240 A1 | 1/2009 | |
| WO | WO 2009/011328 A1 | 1/2009 | |

OTHER PUBLICATIONS

Written Opinion of the International Searching Authority issued in Application No. PCT/IB2009/006452; Dated Nov. 12, 2009.

Japanese Office Action issued in Application No. 2008-204809; Dated Apr. 5, 2010 (With Translation).

Office Action issued in Germany Application No. 11 2009 001 848.3; Dated Oct. 29, 2012.

* cited by examiner

POWER TRANSMITTING APPARATUS AND POWER TRANSMITTING APPARATUS ASSEMBLY METHOD

BACKGROUND OF THE INVENTION

1. Field of the Invention

The invention relates to a power transmitting apparatus and a power transmitting apparatus assembly method. For particularly, the invention relates to a power transmitting apparatus which is provided with i) an electric motor shaft that is connected to a rotor of an electric motor which is one driving source of a vehicle, ii) an input shaft which is arranged parallel to the electric motor shaft and transmits power to and from an internal combustion engine which is another driving source of the vehicle and is positioned on one side in the axial direction, iii) an input shaft rotating member which is provided on the opposite end of the input shaft from the internal combustion engine and transmits at least one of the power of the input shaft or the power of the electric motor shaft to a drive shaft of the vehicle, and iv) a pump that is driven by power from the internal combustion engine and pumps lubrication oil, in which the electric motor is arranged on the opposite side of the input shaft rotating member from the internal combustion engine in the axial direction. The invention also relates to a method of assembling this power transmitting apparatus.

2. Description of the Related Art

A vehicle having a plurality of driving sources is known. One known power transmitting apparatus of such a vehicle is provided with i) an electric motor shaft that is connected to a rotor of an electric motor which is one driving source of the vehicle, ii) an input shaft which is arranged parallel to the electric motor shaft and transmits power to and from an internal combustion engine which is another driving source of the vehicle and is positioned on one side in the axial direction, and iii) an input shaft rotating member which is provided on the opposite end of the input shaft from the internal combustion engine and transmits at least one of the power of the input shaft or the power of the electric motor shaft to a drive shaft of the vehicle.

For example, Japanese Patent Application Publication No. 2002-274201 (JP-A-2002-274201) describes a power transmitting apparatus which is provided with a shaft (i.e., an electric motor shaft) that is connected to a rotor of a motor-generator, an input shaft that transmits power to and from an engine, and a power combining mechanism (i.e., an input shaft rotating member) provided on the input shaft, in which the shaft and the input shaft are eccentrically arranged.

A pump which is driven by power from the internal combustion engine and pumps lubrication oil may also be provided on the input shaft of the power transmitting apparatus. However, depending on how the pump is arranged, it may increase the size of the power transmitting apparatus. In particular, when the electric motor is arranged on the opposite side of the input shaft rotating member from the internal combustion engine in the axial direction, the pump provided on the input shaft may interfere with the electric motor, which may lead to an increase in the size of the power transmitting apparatus.

SUMMARY OF THE INVENTION

In view of the foregoing problems, this invention thus provides a power transmitting apparatus, and an assembly method thereof, in which a pump that is driven by power from an internal combustion engine and pumps lubrication oil is able to be arranged while suppressing an increase in the size of the power transmitting apparatus.

Therefore, a first aspect of the invention relates to a power transmitting apparatus provided with an electric motor shaft that is connected to a rotor of an electric motor which serves as one driving source of a vehicle, an input shaft which is arranged parallel to the electric motor shaft and transmits power to and from an internal combustion engine which serves as another driving source and is positioned on one side in the axial direction, and an input shaft rotating member which is provided on an end portion of the input shaft that is on the side opposite the internal combustion engine side and which transmits at least one of the power from the input shaft or the power from the electric motor shaft to a drive shaft of the vehicle, the electric motor being arranged on the opposite side of the input shaft rotating member from the internal combustion engine in the axial direction. This power transmitting apparatus enables a pump which is driven by power from the internal combustion engine and pumps lubrication oil to be arranged while suppressing an increase in the size of the power transmitting apparatus.

More specifically, the first aspect of the invention relates to a power transmitting apparatus provided with i) an electric motor shaft that is connected to a rotor of an electric motor which serves as one driving source of a vehicle, ii) an input shaft which is arranged parallel to the electric motor shaft and transmits power to and from an internal combustion engine which serves as another driving source and is positioned on one side in the axial direction, iii) an input shaft rotating member which is provided on an end portion of the input shaft that is on the side opposite the internal combustion engine side and which transmits at least one of the power from the input shaft or the power from the electric motor shaft to a drive shaft of the vehicle, iv) a pump which has a pumping apparatus that is driven by the power from the internal combustion engine and pumps lubrication oil, and a pump main body that houses the pumping apparatus, and v) a case that houses the input shaft and the input shaft rotating member, the electric motor being arranged on the opposite side of the input shaft rotating member from the internal combustion engine in the axial direction. In this power transmitting apparatus, the input shaft rotating member is rotatably supported by the case via a bearing, and at least part of the pump is arranged radially inward of the bearing.

Also, in the power transmitting apparatus described above, the input shaft rotating member may include a rotating member main body, and a gear portion which is formed on an outer peripheral portion of the rotating member main body and is in mesh with the electric motor shaft. Also, a rotating member hole portion, which is a hole portion that extends in the axial direction and opens toward the side opposite the internal combustion engine side, may be formed in the rotating member main body, a portion of the rotating member main body in which the rotating member hole portion is formed may be supported by the bearing, and the pump may be arranged in the rotating member hole portion.

Also, in the power transmitting apparatus described above, the pumping apparatus may include a rotating shaft which is coupled to the input shaft and rotatably driven by the power from the internal combustion engine, and a pump rotor which is coupled to the rotating shaft, rotates together with the rotating shaft, and pumps the lubrication oil. Also, the pump main body may include a rotor chamber that houses the pump rotor, a pump main body hole portion which is a hole portion that is connected to the rotor chamber and passes in the axial direction through the pump main body on the internal combustion engine side of the rotor chamber, and in which the rotating shaft is arranged, a passage for the lubrication oil, which is formed in the axial direction in a position between the pump main body hole portion and an outer peripheral portion of the pump main body in the radial direction, and a wall portion that separates the pump main body hole portion and the passage in the radial direction. Further, the rotating shaft may have an annular protruding portion that protrudes in the radial direction, the protruding portion may be sandwiched between the wall portion and the pump rotor in the axial direction, and an outer peripheral portion of the protruding portion may be in the same position in the radial direction as a surface of the wall portion that is on the passage side.

Also, in the power transmitting apparatus described above, the pump main body may include a pump body which is a container that houses the pumping apparatus and has an open portion, and a pump cover that covers the open portion. Also, a positioning member that positions the pump cover with respect to the pump body may also serve as a positioning member that positions the pump main body with respect to the case.

Also, in the power transmitting apparatus described above, the pump main body may have a restricting member which opposes a side face of the bearing and restricts movement of the bearing in the axial direction.

A second aspect of the invention relates to a power transmitting apparatus assembly method for assembling the power transmitting apparatus of the invention. This assembly method includes a first step of pre-assembling the pumping apparatus and the pump main body as an integrated component part, and a second step of assembling the component part to the case after the first step has been performed.

Also, the power transmitting apparatus assembly method described above may also include a third step of assembling the input shaft to the component part, the third step being performed after the second step has been performed.

According to the invention, a power transmitting apparatus is provided with i) an electric motor shaft that is connected to a rotor of an electric motor which serves as one driving source of a vehicle, ii) an input shaft which is arranged parallel to the electric motor shaft and transmits power to and from an internal combustion engine which serves as another driving source and is positioned on one side in the axial direction, iii) an input shaft rotating member which is provided on an end portion of the input shaft that is on the side opposite the internal combustion engine side and which transmits at least one of the power from the input shaft or the power from the electric motor shaft to a drive shaft of the vehicle, iv) a pump which has a pumping apparatus that is driven by the power from the internal combustion engine and pumps lubrication oil, and a pump main body that houses the pumping apparatus, and v) a case that houses the input shaft and the input shaft rotating member, the electric motor being arranged on the opposite side of the input shaft rotating member from the internal combustion engine in the axial direction. In this power transmitting apparatus, the input shaft rotating member is rotatably supported by the case via a bearing.

Also, at least part of the pump is arranged radially inward of the bearing. Arranging the pump using the space that is radially inward of the bearing that supports the input shaft rotating member in this way enables the pump to be arranged while suppressing an increase in the size of the power transmitting apparatus.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

An example embodiment of the power transmitting apparatus and power transmitting apparatus assembly method of the invention will be described in greater detail below with reference to the accompanying drawings.

This example embodiment will be described with reference to FIGS. 1 to 5. This example embodiment relates to a power transmitting apparatus that is provided with i) an electric motor shaft that is connected to a rotor of an electric motor which serves as one driving source of a vehicle, ii) an input shaft which is arranged parallel to the electric motor shaft and transmits power to and from an internal combustion engine which serves as another driving source and is positioned on one side in the axial direction, iii) an input shaft rotating member which is provided on an end portion of the input shaft that is on the side opposite the internal combustion engine side and which transmits at least one of the power from the input shaft or the power from the electric motor shaft to a drive shaft of the vehicle, iv) a pump which is driven by the power from the internal combustion engine and pumps lubrication oil, and v) a case that houses the input shaft and the input shaft rotating member, the electric motor being arranged on the opposite side of the input shaft rotating member from the internal combustion engine in the axial direction. The example embodiment also relates to an assembly method of this power transmitting apparatus.

Figure 1:
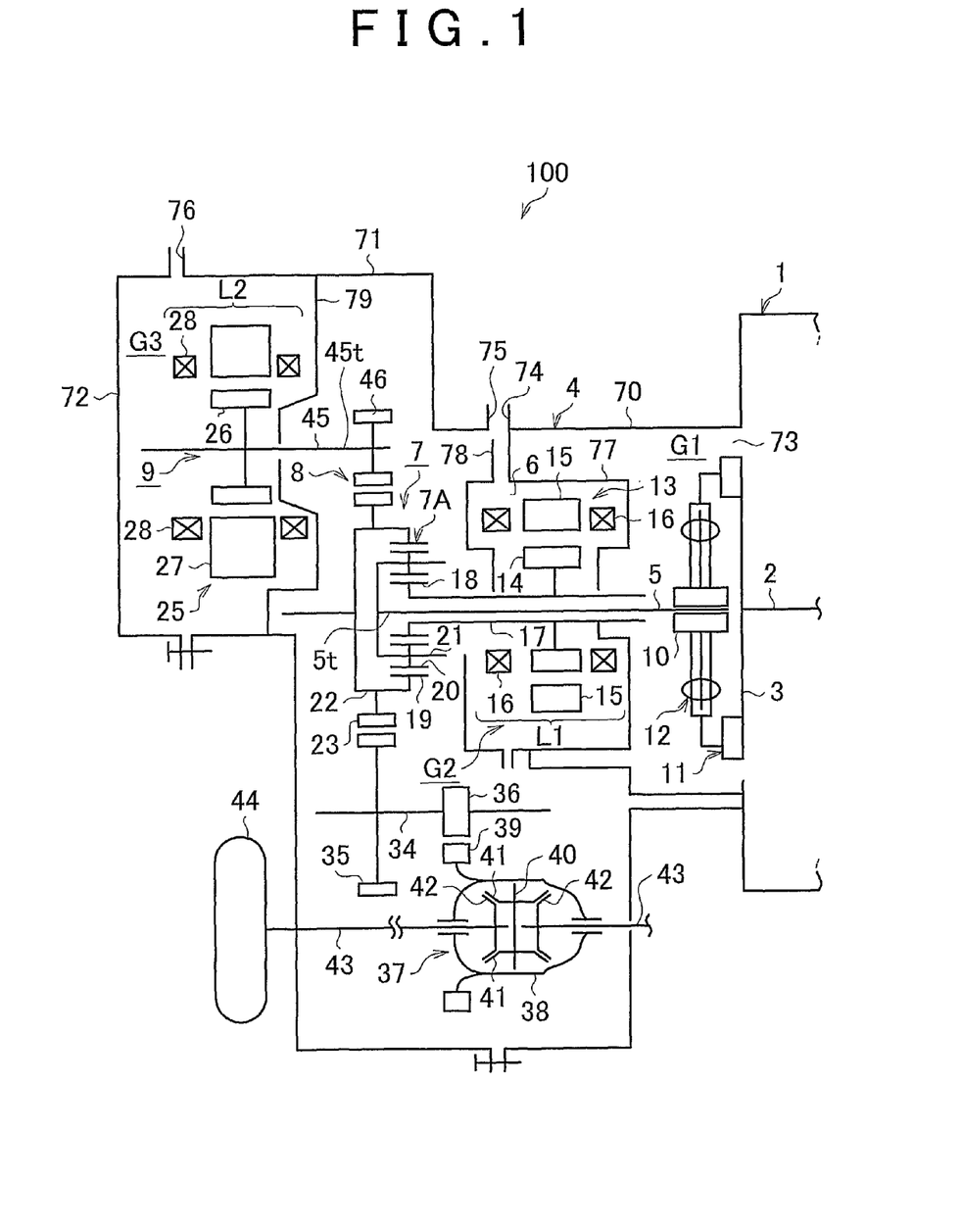
FIG. 1 is a skeleton view of a power transmitting apparatus according to an example embodiment of the invention.

FIG. 1 is a skeleton view of a power transmitting apparatus 100 of a FF (front engine, front drive; front engine front wheel drive) type hybrid vehicle to which this example embodiment of the invention has been applied. In FIG. 1, reference numeral 1 denotes an engine. This engine 1 may be an internal combustion engine, or more specifically, a gasoline engine, a diesel engine, an LPG engine, a methanol engine, or a hydrogen engine or the like.

In this example embodiment, for the sake of convenience, the engine 1 will be described as a gasoline engine. The engine 1 is a well-known apparatus that outputs power from a crankshaft 2 by combusting a fuel and includes an intake system, an exhaust system, a fuel injection device, an ignition device, and a cooling apparatus and the like. The crankshaft 2 is arranged horizontal and extending in the width direction of the vehicle. A flywheel 3 is formed on the rear end of the crankshaft 2.

A hollow transaxle case (i.e., a case) 4 is attached to the outer wall of the engine 1. This transaxle case 4 has an engine-side housing 70, an extension housing 71, and an end cover 72, all of which are fabricated out of metal such as aluminum. Also, the engine 1 and the engine-side housing 70 are fixed to each other while one open end 73 of the engine-side housing 70 is contacting the engine 1.

Also, the extension housing 71 is arranged between the engine-side housing 70 and the end cover 72. Moreover, the engine-side housing 70 and the extension housing 71 are fixed to each other while the other open end 74 of the engine-side housing 70 contacts one open end 75 of the extension housing 71. Also, the end cover 72 and the extension housing 71 are fixed to each other with the end cover 72 attached to the extension housing 71 so as to cover the other open end 76 of the extension housing 71.

An input shaft 5, a first motor-generator 6, a power combining mechanism 7, a shifting mechanism 8, and a second motor-generator (i.e., electric motor) 9 are provided in a space G1 inside the transaxle case 4. The input shaft 5 is arranged on the same axis as the crankshaft 2. A clutch hub 10 is spline-engaged with the end portion of the input shaft 5 that is on the crankshaft 2 side.

A clutch 11 that controls the power transmission state between the flywheel 3 and the input shaft 5 is provided in the transaxle case 4. Also, a damper mechanism 12 that suppresses and absorbs torque fluctuation between the flywheel 3 and the input shaft 5 is also provided. The input shaft 5 transmits power to and from the engine 1, which is arranged on one side in the axial direction, via the flywheel 3, the clutch 11, the damper mechanism 12, and the clutch hub 10 and the like. The first motor-generator 6 is arranged on the outside of the input shaft 5 and the second motor-generator 9 is arranged in a position that is farther away from the engine 1 than the first motor-generator 6 is.

That is, the first motor-generator 6 is arranged between the engine 1 and the second motor-generator 9. The first motor-generator 6 and the second motor-generator 9 are each able to function as an electric motor (i.e., each have a powering function) that operates using supplied power, as well as a generator that converts mechanical energy into electrical energy (i.e., each have a regenerating function). An AC synchronous motor-generator, for example, may be used for both the first motor-generator 6 and the second motor-generator 9. A power storage device such as a battery or a capacitor, or a well-known fuel cell or the like, may be used as the power supply apparatus that supplies power to the first motor-generator 6 and the second motor-generator 9.

The arrangement and structure of the first motor-generator 6 will now be described in detail. A partition wall 77 that extends toward the engine 1 and, along the way, toward the input shaft 5 is formed on the inside surface of the engine-side housing 70. Further, a case cover 78 is fixed to the partition wall 77. This case cover 78 is shaped extending away from the engine 1, and along the way, toward the input shaft 5. The first motor-generator 6 is arranged in a space G2 enclosed by the partition wall 77 and the case cover 78. The first motor-generator 6 has a stator 13 that is fixed to the transaxle case 4 side, and a rotatable rotor 14. The stator 13 has a core 15 that is fixed to the partition wall 77, and a coil 16 that is wound around the core 15.

The stator 13 and the rotor 14 are formed of a plurality of magnetic steel sheets of a predetermined thickness stacked in the thickness direction. Incidentally, the plurality of magnetic steel sheets are stacked in the axial direction of the input shaft 5. The area between both ends of the coil 16 of the first motor-generator 6 in the axial direction of the input shaft 5 is the allocated area L1 of the first motor-generator 6 in the axial direction of the input shaft 5. Meanwhile, a hollow shaft 17 is fixed over the outer periphery of the input shaft 5. This hollow shaft 17 is able to rotate relative to the input shaft 5. The rotor 14 is coupled to the outer peripheral side of the hollow shaft 17.

Also, the power combining mechanism, i.e., a power split device, 7 is provided between the first motor-generator 6 and the second motor-generator 9. This power combining mechanism 7 has a so-called single pinion planetary gear set 7A. That is, the planetary gear set 7A has a sun gear 18, a ring gear 19 that is concentrically arranged with the sun gear 18, and a carrier 21 which retains pinions 20 that are in mesh with the sun gear 18 and the ring gear 19. The sun gear 18 is coupled to the hollow shaft 17 and the carrier 21 is coupled to the input shaft 5. Incidentally, the ring gear 19 is coupled to an annular member (i.e., a cylindrical member) 22 that is concentrically arranged with the input shaft 5. A counter drive gear 23 is formed on the outer peripheral side of this annular member 22. This counter drive gear 23 is provided on the end portion of the input shaft 5 that is opposite the engine 1 side in the axial direction.

The second motor-generator 9 is provided in a position farther away from the engine 1 than the counter drive gear 23 is. A rotor 26 of the second motor-generator 9 is coupled to the outer periphery of a MG shaft (i.e., an electric motor shaft) 45. This MG shaft 45 is arranged substantially horizontal in the width direction of the vehicle. The MG shaft 45 is eccentrically arranged with respect to the input shaft 5 and the hollow shaft 17.

That is, the input shaft 5 is arranged parallel to the MG shaft 45. In other words, the input shaft 5 is arranged in the axial direction of the MG shaft 45 in a position away from the MG shaft 45 in the radial direction of the MG shaft 45. A region 5t of part of the input shaft 5 in the axial direction, including the end portion of the input shaft 5 on the end cover 72 side in the axial direction, and a region 45t of part of the MG shaft 45 in the axial direction, including the end portion of the MG shaft 45 on the engine 1 side in the axial direction, radially oppose one another. In other words, the MG shaft 45 extends in the axial direction toward the end cover 72 from a gear 46, which will be described later, that transmits power to and from the power combining mechanism 7, while the input shaft 5 extends toward the engine 1 from the power combining mechanism 7.

Next, the arrangement and structure of the second motor-generator 9 will be described in detail. A partition wall 79 that extends toward the MG shaft 45 is formed on the inside surface of the extension housing 71. This partition wall 79 faces the side of the gear 46 in the axial direction that is opposite the engine 1 side of the gear 46. The second motor-generator 9 is arranged in a space G3 enclosed by the extension housing 71, the partition wall 79, and the end cover 72.

The second motor-generator 9 has a stator 25 that is fixed to the transaxle case 4 side, and a rotatable rotor 26. The stator 25 has a core 27 and a coil 28 that is wound around the core 27. The stator 25 and the rotor 26 are formed of a plurality of magnetic steel sheets of a predetermined thickness stacked, in the thickness direction. Incidentally, the plurality of magnetic steel sheets are stacked in the axial direction of the MG shaft 45. The area between both ends of the coil 28 of the second motor-generator 9 in the axial direction of the MG shaft 45 corresponds to the allocated area L2 of the second motor-generator 9 in the axial direction of the MG shaft 45.

As described above, the first motor-generator 6 and the second motor-generator 9 are arranged in different positions in the axial direction of the input shaft 5 and the hollow shaft 17, and the MG shaft 45. More specifically, the first motor-generator 6 and the second motor-generator 9 are arranged so that their allocated areas L1 and L2 do not overlap. Also, the rotational center (i.e., the center axis) of the first motor-generator 6 and the rotational center (i.e., the center axis) of the second motor-generator 9 are offset in the radial direction of their shafts.

The gear 46 is formed on (i.e., coupled to) the end portion of the MG shaft 45 that is on the power combining mechanism 7 side. The gear 46 is a helical gear that is in mesh (i.e., engaged) with the counter drive gear 23. The counter drive gear 23 and the gear 46 are structured such that the gear ratio when power is transmitted from the gear 46 to the counter drive gear 23 is greater than 1. The gear 46 and the counter drive gear 23 together form the shifting mechanism 8. When power is transmitted from the second motor-generator 9 to the gear 46 via the MG shaft 45, the rotation speed of the gear 46 is reduced and transmitted to the annular member 22. That is, the torque of the second motor-generator 9 is multiplied and transmitted to the power combining mechanism 7.

Meanwhile, a counter shaft 34 that is parallel to the input shaft 5 is provided inside the transaxle case 4. A counter driven gear 35 and a final drive pinion 36 are formed on the counter shaft 34. The counter driven gear 35 is engaged with the counter drive gear 23. Further, a differential 37 is provided inside the transaxle case 4. This differential 37 has a final ring gear 39 formed on the outer peripheral side of a differential case 38, a plurality of pinions 41 which are mounted on a pinion shaft 40 to the differential case 38, a plurality of side gears 42 that are engaged with the plurality of pinions 41, and two front drive shafts (i.e., drive shafts) 43, one of which is coupled to each side gear 42. A front wheel 44 is connected to each front drive shaft 43. In this way, a so-called transaxle which incorporates the shifting mechanism 8 and the differential 37 all together is formed inside the transaxle case 4.

Here, the arrangement of each shaft in the transaxle case 4 will be described with reference to FIG. 2 which shows the arrangement of the shafts in the power transmitting apparatus 100 as viewed from the end cover 72 side (see FIG. 1).

The shafts 5, 34, 43, and 45 are arranged as described below. The MG shaft 45 is arranged diagonally above the input shaft 5 and the counter shaft 34 is arranged diagonally below the input shaft 5. The center axis C6 of the counter shaft 34 is slightly below the center axis C5 of the front drive shaft 43. The center axis C6 of the counter shaft 34 is below a virtual line L4 that connects the center axis C3 of the input shaft 5 with the center axis C5 of the front drive shaft 43. Arranging the MG shaft 45 in the upper portion inside the transaxle case 4, the counter shaft 34 in the lower portion of the transaxle case 4, and having the counter drive gear 23 also serve as a driven gear that is driven by the gear 46 enables the shafts 5, 34, 43, and 45 to be compactly arranged overall. This is highly advantageous in that it reduces the cost which is a big issue with hybrid vehicles, improves mountability in the vehicle, and reduces mass, and the like.

Figure 2:
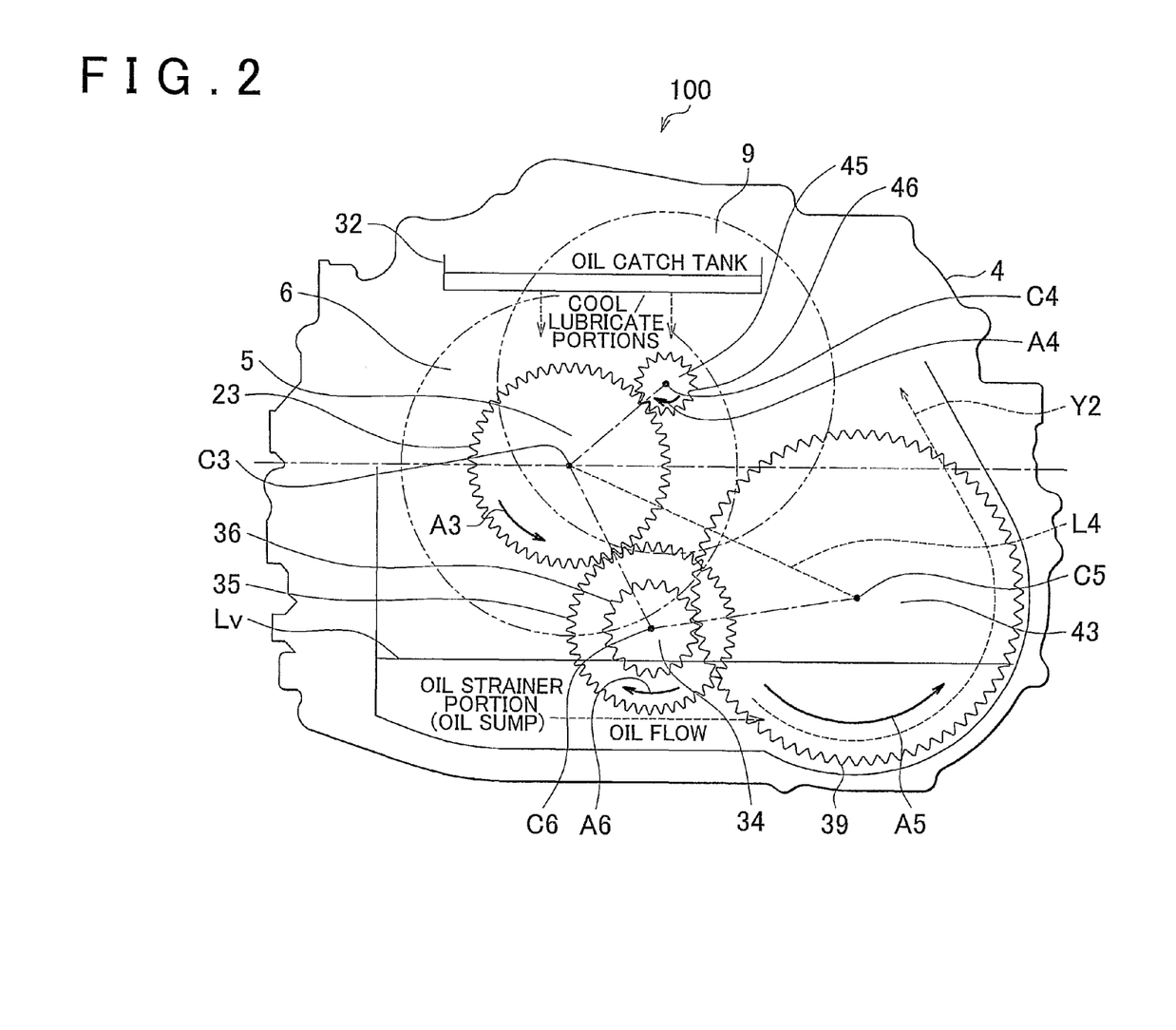
FIG. 2 is a view of the arrangement of shafts in the power transmitting apparatus according to the example embodiment of the invention, as viewed from the side of FIG. 1.

The direction of rotation of each of the shafts 5, 45, 43, and 34 is shown by arrows A3 to A6 in FIG. 2. That is, the front drive shaft 43 rotates in the counterclockwise direction and the counter shaft 34 rotates in the clockwise direction. In other words, the front drive shaft 43 and the counter shaft 34 rotate in opposite directions, with the regions of the shafts that are below the center axes rotating away from one another. Incidentally, the rotational directions in shown in the drawing are for a case in which the vehicle is traveling forward. Also, unless otherwise noted, the vertical direction in the description of the example embodiment refers to the vertical direction when the power transmitting apparatus mounted in the vehicle.

In the power transmitting apparatus 100 of this example embodiment, lubrication oil stored in the lower portion of the transaxle case 4 is picked up by the final ring gear 39 (see arrow Y2) and flung to the oil catch tank 32 provided in the upper portion of the transaxle case 4. An appropriate amount of lubrication oil then drips down from the oil catch tank 32 toward portions to be lubricated or cooled in the transaxle case 4.

In the hybrid vehicle structured as described above, the required torque to be transmitted to the front wheels 44 is calculated based on conditions such as the vehicle speed and the accelerator operation amount. The engine 1, the clutch 11, the first motor-generator 6, and the second motor-generator 9 are all controlled based on those calculation results. When torque output from the engine 1 is to be transmitted to the front wheels 44, the clutch 11 is applied. When the clutch 11 is applied, the power (i.e., torque) of the crankshaft 2 is transmitted to the carrier 21 via the input shaft 5.

Torque transmitted to the carrier 21 is then transmitted to the front wheels 44 via the ring gear 19, the annular member 22, the counter drive gear 23, the counter driven gear 35, the counter shaft 34, the final drive pinion 36, and the differential 37, such that driving force is generated. Also, when torque from the engine 1 is transmitted to the carrier 21, the first motor-generator 6 may function as a generator, and the generated power may be stored in a power storage device, not shown.

Further, the second motor-generator 9 may be driven as an electric motor and transmit power to the power combining mechanism 7. When power is transmitted from the second motor-generator 9 to the gear 46 via the MG shaft 45, the rotation speed of the gear 46 is reduced and transmitted to the annular member 22. That is, the torque of the second motor-generator 9 is multiplied and transmitted to the power combining mechanism 7. In this way, both the power from the engine 1 and the power from the second motor-generator 9 are input to the power combining mechanism 7 where they are combined, and then this combined power is transmitted to the wheels 44. That is, the power combining mechanism 7 (i.e., the counter drive gear 23) transmits the combined power from the engine 1 and the second motor-generator 9 to the front wheels 44, or transmits at least one of the power from the engine 1 or the power from the second motor-generator 9 to the front wheel 44.

As described above, in the power transmitting apparatus 100 of this example embodiment, the shafts 5, 34, 43, and 45 are able to be arranged compactly overall by arranging the input shaft 5 and the MG shaft 45 on different axes and the like. As a result, the entire power transmitting apparatus 100 can be made more compact. This kind of power transmitting apparatus 100 may also be provided with an oil pump. For example, an oil pump which is driven by power from the engine 1 and supplies lubrication oil inside the transaxle case 4 may be provided. In this case, it is preferable to be able to suppress an increase in the size of the power transmitting apparatus 100 due to the oil pump being provided.

Figure 3:
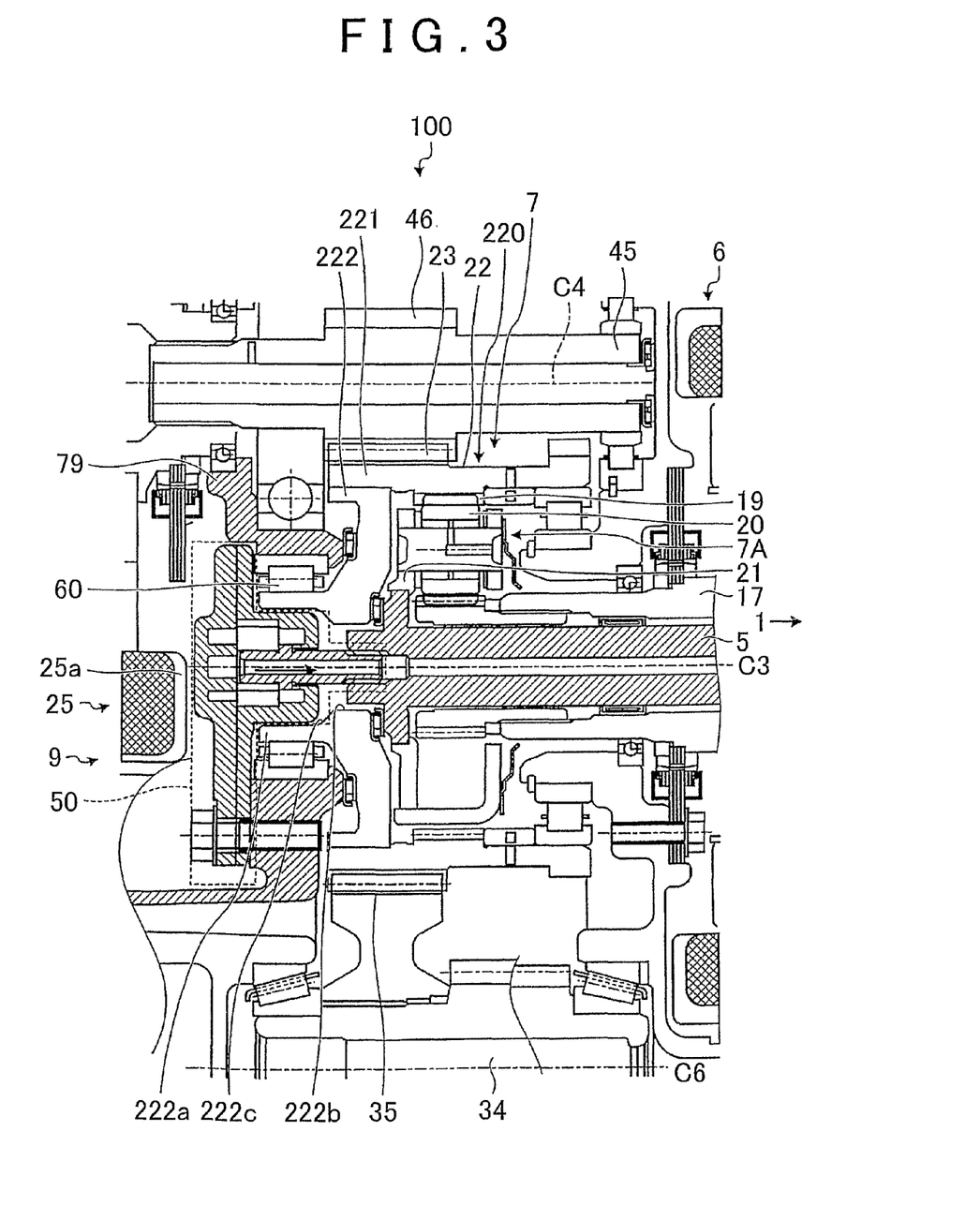
FIG. 3 is a sectional view of the main portions of the power transmitting apparatus according to the example embodiment of the invention.

In the power transmitting apparatus 100 of this example embodiment, the counter drive gear 23 is rotatably supported by the case via a bearing 60 (see FIG. 3). The counter drive gear 23 is provided on the end portion of the input shaft 5 and transmits power from at least one of the input shaft 5 and the MG shaft 45 to the drive shaft of the vehicle. A rotating member hole portion 222c (see FIG. 3) that opens to the side opposite the engine 1 is formed in an annular member second component 222 (see FIG. 3) that is coupled to the counter drive gear 23. The bearing 60 supports this annular member second component 222.

At least part of an oil pump 50 (see FIG. 3) which is driven by power from the engine 1 and pumps lubrication oil is arranged radially inward of the bearing 60. More specifically, at least part of the oil pump 50 is arranged in a position that is radially inward of the bearing 60 in the rotating member hole portion 222c. According to this example embodiment, utilizing the space that is radially inward of the bearing 60 makes it possible to arrange the oil pump 50 while suppressing an increase in the size of the power transmitting apparatus 100.

FIG. 3 is a sectional view of the main portions of the power transmitting apparatus 100 according to this example embodiment. The planetary gear set 7A is arranged on the end portion of the input shaft 5 that is on the opposite side from the engine 1 side (i.e., on the end portion of the input shaft that is on the second motor-generator 9 side). As described above, the input shaft 5 is coupled to the carrier 21 which retains the pinions 20 of the planetary gear set 7A. The annular member (i.e., the rotating member main body) 22 is arranged to the outside of the pinions 20 in the radial direction of the planetary gear set 7A. The ring gear 19 which is formed on an inner peripheral portion of the annular member 22 is in mesh with the pinions 20.

The annular member 22 is formed of an annular member first component 221 and the annular member second component 222 that is press-fit into the annular member first component 221. The annular member first component 221 is formed in a hollow cylindrical shape. The ring gear 19 is formed on the inner peripheral portion of the annular member first component 221 and the counter drive gear (i.e., the gear portion) 23 is formed on the outer peripheral portion of the annular member first component 221. The annular member second component 222 is press-fit into the end portion of the annular member first component 221 that is on opposite side from the engine 1 side. The input shaft rotating member 220 in this example embodiment includes the annular member components 221 and 222, the counter drive gear 23, and the ring gear 19.

The annular member second component 222 is formed in a disc shape with a through-hole 222b through which the input shaft 5 passes formed in the center. A cylindrical portion 222a that protrudes in the axial direction toward the side opposite the engine 1 side is provided on the annular member second component 222. This cylindrical portion 222a is formed in a hollow cylindrical shape and opens toward the side opposite the engine 1 side. That is, the inside wall surface of the cylindrical portion 222a forms the rotating member hole portion 222c which is a hole portion that extends in the axial direction and opens toward the side opposite the engine 1 side.

The cylindrical portion 222a is rotatably supported by the partition wall 79 via the bearing 60. That is, the cylindrical portion 222a, which is a portion in which the rotating member hole portion 222c is formed in the annular member 22 that is the rotating member main body, is rotatably supported by the transaxle case 4 via the bearing 60. The bearing 60 is provided on the outer peripheral portion of the cylindrical portion 222a.

Figure 4:
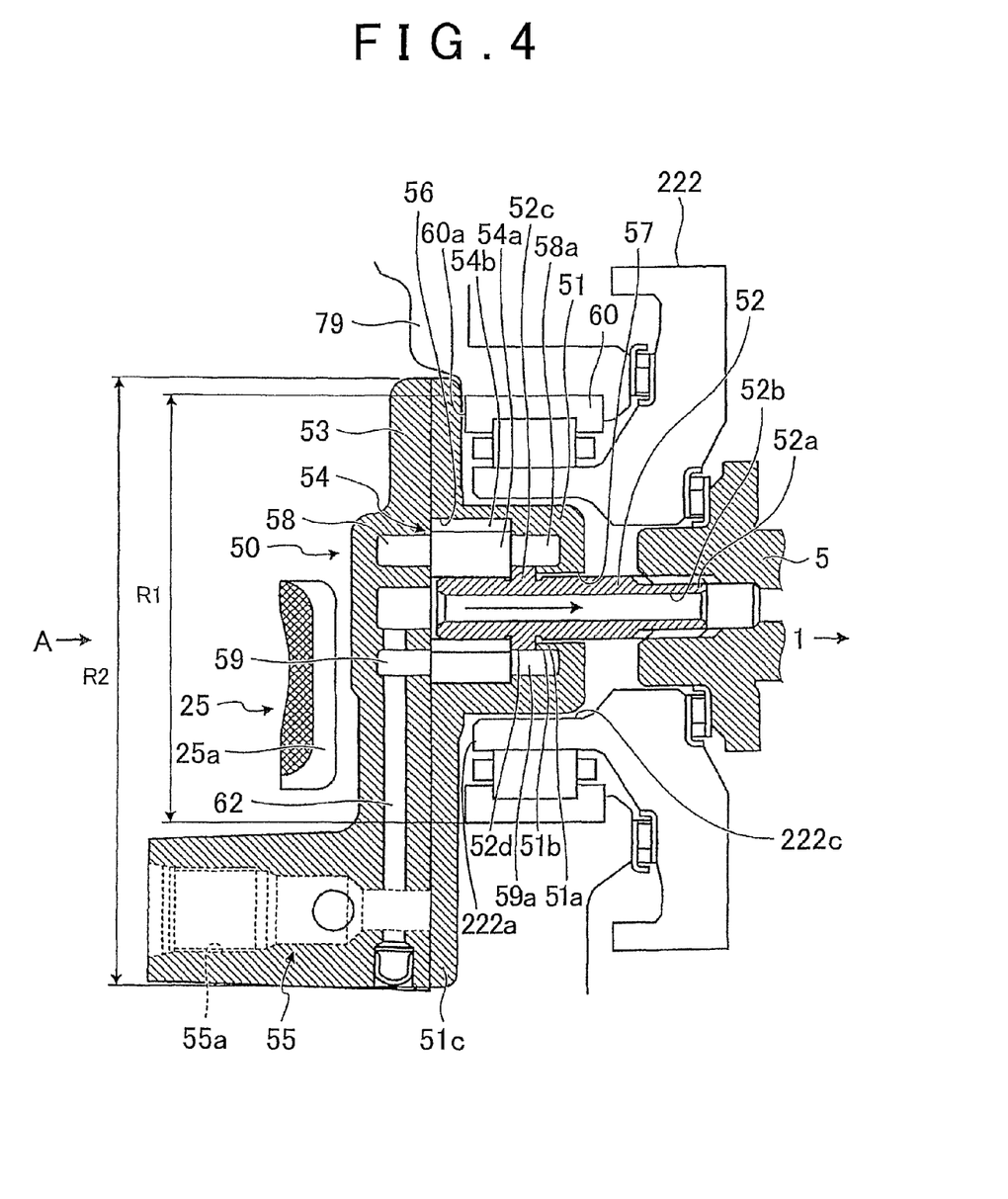
FIG. 4 is an enlarged sectional view of the area near an oil pump of the power transmitting apparatus of the example embodiment of the invention.

The oil pump 50 is arranged in the rotating member hole portion 222c. FIG. 4 is an enlarged sectional view of the area near the oil pump 50. The oil pump 50 includes a pump body 51, a pump drive shaft (i.e., a rotating shaft) 52, a pump cover 53, a pump rotor 54, and a relief valve 55.

A drive rotor 54a is coupled to the pump drive shaft 52. This drive rotor 54a is coupled to an outer peripheral portion of the pump drive shaft 52 and therefore rotates together with the pump drive shaft 52. A rotor chamber 56 is formed in the pump body 51. The drive rotor 54a and a driven rotor 54b which is rotatably provided and in mesh with the drive rotor 54a are arranged in the rotor chamber 56. The pump rotor 54 which consists of the drive rotor 54a and the driven rotor 54b makes up a well-known trochoid pump. The structure that includes the pump drive shaft 52 and the pump rotor 54 is one example of a pumping apparatus of the invention.

A pump main body hole portion 57 is provided in the pump body 51. This pump main body hole portion 57 is connected to the rotor chamber 56 and passes in the axial direction through the pump body 51 on the engine 1 side of the rotor chamber 56. The pump drive shaft 52 is arranged in this pump main body hole portion 57 with the drive rotor 54a housed in the rotor chamber 56. The end portion 52a of the pump drive shaft 52 on the engine 1 side protrudes out from the pump main body hole portion 57 on the engine 1 side. This end portion 52a of the pump drive shaft 52 on the engine 1 side is spline-engaged with the input shaft 5. Accordingly, the pump drive shaft 52 rotates together with the input shaft 5 and is thus rotatably driven by the power of the engine 1.

A shaft internal oil passage 52b is formed inside the pump drive shaft 52. This shaft internal oil passage 52b passes through the pump drive shaft 52 in the axial direction. Lubrication oil that has been compressed (i.e., pressurized) by the pump rotor 54 is sent to various parts in the power transmitting apparatus 100 via a high pressure oil passage 62, which will be described later, and the shaft internal oil passage 52b.

The pump cover 53 is fixed to the end portion of the pump body 51 that is on the side opposite the engine 1 side. The pump cover 53 covers the open portion of the pump body 51. The pump main body in this example embodiment is formed by the pump body 51 and the pump cover 53. An intake port 58 and a discharge port 59, which are lubrication oil passages, are provided in both the pump body 51 and the pump cover 53. Lubrication oil is drawn into the rotor chamber 56 through the intake port 58, and lubrication oil that has been compressed in the rotor chamber 56 is discharged through the discharge port 59, after which it is delivered to various parts in the power transmitting apparatus 100.

Figure 5:
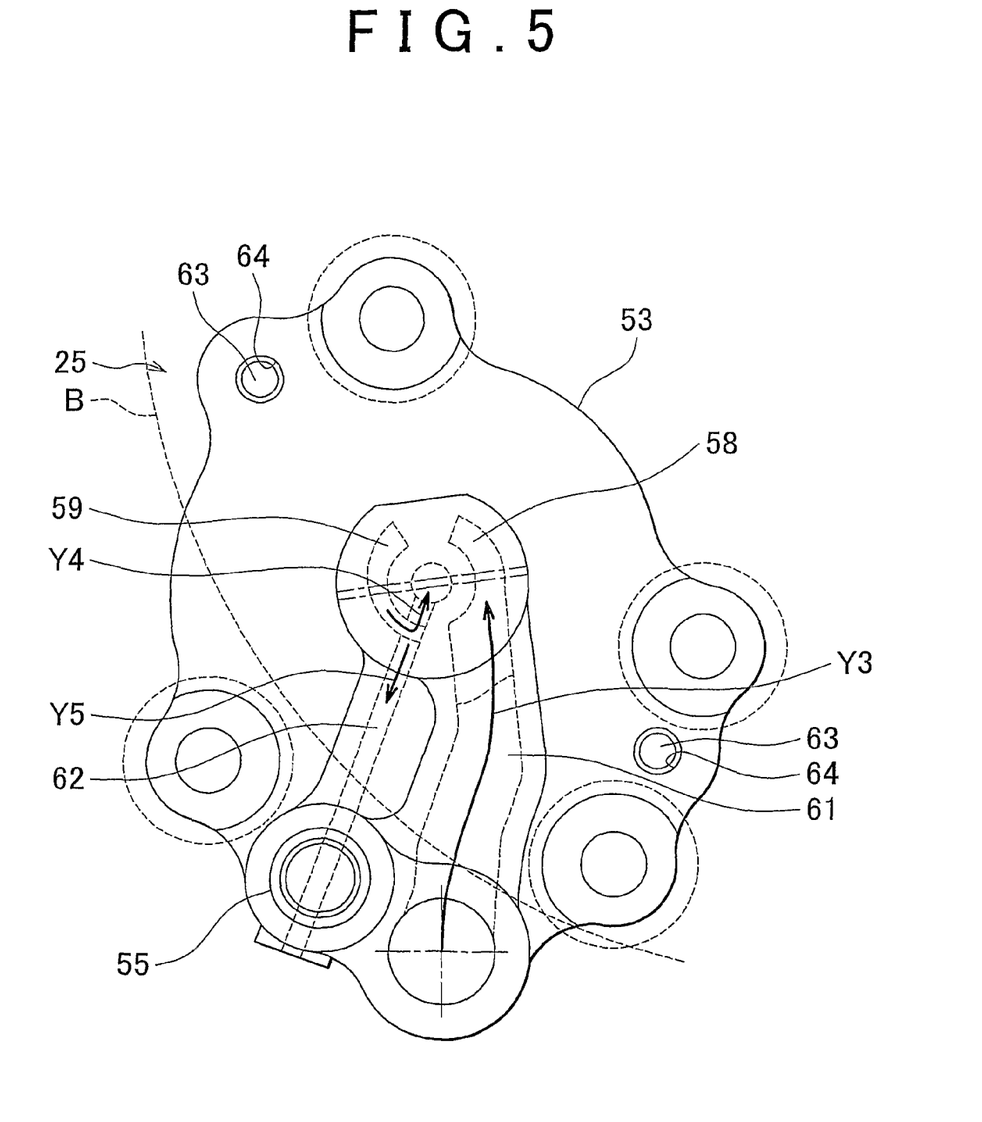
FIG. 5 is a plan view of a pump cover of the power transmitting apparatus of the example embodiment of the invention.

FIG. 5 is a plan view of the pump cover 53 as viewed from the direction indicated by arrow A in FIG. 4. As shown in FIG. 5, an oil supply passage 61 that is connected to the intake port 58 and the high pressure oil passage 62 that is connected to the discharge port 59 are provided in the pump cover 53. Lubrication oil is supplied to the intake port 58 through the oil supply passage 61, as indicated by arrow Y3. Also, the lubrication oil that has been compressed in the rotor chamber 56 and discharged through the discharge port 59 flows into the high pressure oil passage 62. The lubrication oil then flows from the high pressure oil passage 62 to the shaft internal oil passage 52b (see FIG. 4), as indicated by arrow Y4. Also, if the oil pressure in the high pressure oil passage 62 exceeds a relief pressure of a relief valve 55, the excess lubrication oil is discharged through the relief valve 55 (arrow Y5).

As shown in FIG. 4, in this example embodiment, at least a portion of the oil pump 50 is arranged radially inward of the bearing 60 in the rotating member hole portion 222c. More specifically, the pump body 51 and the pump rotor 54 which serves as the pumping apparatus are arranged radially inward of the bearing 60. Using the space radially inward of the bearing 60 to arrange the oil pump 50 in this way makes it possible to suppress an increase in the overall length of the transaxle. Accordingly, the power transmitting apparatus 100 can be inhibited from becoming large.

In this example embodiment, the intake port 58 and the discharge port 59 are formed not only in the pump cover 53, but also in the pump body 51. The reason for this is as follows. With the oil pump 50 which is driven by the rotation of the engine 1, the flowrate of the lubrication oil increases as the engine speed increases. In this case, increasing the conduit area helps to inhibit cavitation. Although it is possible to enlarge the intake port 58 and the discharge port 59 in the radial direction, for example, in this example embodiment the radial size of the pump body 51 is limited by the diameter of the bearing 60 so it is difficult to make the ports 58 and 59 larger in the radial direction. On the other hand, if the ports 58 and 59 are made longer in the axial direction by being lengthened on the side opposite the engine 1 side, the pump cover 53 becomes thicker, which increases the overall length of the transaxle.

Therefore, in this example embodiment, the intake port 58 and the discharge port 59 are formed not only in the pump cover 53, but also in the pump body 51, so that they are longer in the axial direction. As a result, the conduit area of the ports 58 and 59 is increased, thereby inhibiting cavitation, while an increase in the overall length of the transaxle is suppressed.

As shown in FIG. 4, the pump body side intake port 58a, which is the portion of the intake port 58 that is provided in the pump body 51, is provided between the pump main body hole portion 57 and the outer peripheral portion of the pump body 51. Similarly, the pump body side discharge port 59a, which is the portion of the discharge port 59 that is provided in the pump body 51, is provided between the pump main body hole portion 57 and the outer peripheral portion of the pump body 51. The pump body side intake port 58a and the pump main body hole portion 57, as well as the pump body side discharge port 59a and the pump main body hole portion 57, are separated by a wall portion 51a.

An annular protruding portion 52c which protrudes in the radial direction is formed on an outer peripheral portion of the pump drive shaft 52. This protruding portion 52c functions as positioning means for positioning the pump drive shaft 52 in the axial direction, as well as retaining means for preventing the pump drive shaft 52 from slipping out of the pump body 51. The protruding portion 52c is sandwiched between the drive rotor 54a and the wall portion 51a. The end of the protruding portion 52c that is on the side opposite the engine 1 side in the axial direction abuts against the drive rotor 54a, while the end of the protruding portion 52c that is on the engine 1 side in the axial direction abuts against the wall portion 51a. This keeps the pump drive shaft 52 in position in the axial direction, as well as prevents it from slipping out of the pump body 51.

Also, an outer peripheral portion 52d of the protruding portion 52c doubles as part of the inner surface of the pump body side intake port 58a and part of the inner surface of the pump body side discharge port 59a. The outer peripheral portion 52d of the protruding portion 52c is at the same position in the radial direction as the surface 51b on the radially outward side of the wall portion 51a. In other words, the outer peripheral portion 52d of the protruding portion 52c is at the same position in the radial direction as the surface that is on the lubrication oil passage (i.e., the pump body side intake port 58a and pump body side discharge port 59a) side of the wall portion 51a. That is, the outer peripheral portion 52d of the protruding portion 52c forms part of a wall surface that surrounds the ports 58a and 59a, and is continuous with the radial outward surface 51b of the wall portion 51a.

Accordingly, the protruding portion 52c does not impede the flow of lubrication oil through the pump body side intake port 58a and the pump body side discharge port 59a, so the lubrication oil is able to flow smoothly. Also, having the pump drive shaft 52 also serve as part of the inner surfaces of the ports 58a and 59a enables the ports 58a and 59a, as well as the oil pump 50 itself, to be made smaller in the radial direction.

Further, rotation of the protruding portion 52c that folios part of the inner wall surface of the ports 58a and 59a promotes the flow of lubrication oil, thus enabling the lubrication oil to be drawn in and discharged quickly. The pump drive shaft 52 rotates in the same direction as the direction in which the lubrication oil which flows through the intake port 58 toward the rotor chamber 56 flows, and the same as the direction in which the lubrication oil which is discharged from the rotor chamber 56 and flows through the discharge port 59 flows. This promotes the flow of lubrication oil through the ports 58 and 59.

In this example embodiment, as will be described below, a positioning member that positions the pump cover 53 with respect to the pump body 51 also serves as a positioning member that positions the oil pump 50 with respect to the transaxle case 4. As a result, the number of parts and operations does not increase so the oil pump 50 can be sub-assembled at a low cost.

In FIG. 5, reference numeral 63 denotes a knock pin (i.e., the positioning member). Positioning holes 64 are formed in corresponding positions in the pump body 51 and the pump cover 53. The pump cover 53 is able to be kept in position with respect to the pump body 51 (in a direction orthogonal to the axial direction) by press-fitting the knock pin 63 into the positioning holes 64 in the pump body 51 and the pump cover 53.

In this example embodiment, the oil pump 50 is sub-assembled (made into an integrated component part) by assembling the pump body 51, the pump cover 53, the pump rotor 54, and the pump drive shaft 52 together. Sub-assembling the oil pump 50 in this way makes it easier to assemble onto the transaxle compared to when each of the parts 51, 52, 53, and 54 of the oil pump 50 are assembled into the power transmitting apparatus in a main assembly line. Accordingly, the main assembly line can be shortened and the cost can be reduced because the sub-assembly of the oil pump 50 can be checked independently.

Assembly involves three steps, the order of which is as follows. First, the oil pump is pre-assembled as a sub-assembly (step 1). Then, the sub-assembly of the oil pump 50 is assembled to the transaxle case 4 (step 2). Then the assembled second motor-generator 9 is checked, and the input shaft 5 and the gears are assembled (step 3). With the conventional structure in which the oil pump is not sub-assembled, the pump drive shaft 52 is assembled to the drive rotor 54a later on in the main assembly line. In this case, the bell and spigot position of the drive rotor 54a may become off, making assembly of the pump drive shaft 52 difficult. The oil pump of this example embodiment that has been sub-assembled is assembled to the transaxle case 4 after the pump drive shaft 52 has already been assembled. Therefore, there is no need to drastically change the assembly process due to the assembly of the oil pump 50. The oil pump 50 can be assembled without reversing any processes during the assembly of the transaxle.

As will be described below, a restricting member which restricts the movement of the bearing 60 in the axial direction is provided in the oil pump 50 of this example embodiment. A flange portion 51c is formed on the pump body 51. This flange portion 51c is formed on the end of the pump body 51 on the side opposite the engine 1 side. The flange portion 51c serves as a mounting portion, in which bolt holes for receiving bolts used to fasten the pump body 51 to the transaxle case 4 are formed, as well as a restricting member that restricts the movement of the bearing 60 in the axial direction. The flange portion 51c is located on the opposite side of the bearing 60 from the engine 1 side in the axial direction. The diameter R2 of the flange portion 51c is larger than the outer diameter R1 of the bearing 60. Therefore, the flange portion 51c opposes the side face 60a of the bearing 60 that is on the side opposite the engine 1 side. Accordingly, the flange portion 51c prevents the bearing 60 from slipping out on the side opposite the engine 1 side. Incidentally, the bearing 60 is prevented from moving toward the engine 1 by the partition wall 79.

Having the flange portion 51c serve as a restricting member that restricts the movement of the bearing 60 in the axial direction as in this way makes it possible to eliminate a special member for preventing the bearing 60 from slipping out. Also, in this example embodiment, the relief valve 55 is provided in a position where it will not interfere with the stator 25.

In FIG. 5, the broken line B indicates the outer periphery of the coil end of the stator 25. As shown in FIGS. 4 and 5, the relief valve 55 is arranged so that it does not overlap with the coil end 25a of the stator 25 in the axial direction. In other words, on a plane that is orthogonal to the axial direction, the relief valve 55 is arranged so that the projection of the coil end 25a of the stator 25 does not overlap with the projection of the relief valve 55. Also, a relief passage 55a of the relief valve 55 is provided in the axial direction. Arranging the relief valve 55 in the axial direction in a position where it does not overlap with the stator 25 in the axial direction in this way enables the pump cover 53 to be made even thinner. Eliminating the retaining member of the bearing 60 and making the pump cover 53 thinner reduces the overall length of the transaxle and makes it easier to mount the power transmitting apparatus 100 in the vehicle.

Incidentally, instead of making the diameter R2 of the flange portion 51c larger than the outer diameter R1 of the bearing 60, i.e., instead of having the flange portion 51c oppose the side face of the bearing 60 all around in the circumferential direction, at least part of the flange portion 51c may be made to oppose the side face 60a of the bearing 60. In this case as well, the flange portion 51c is also able to function as a restricting member that prevents the bearing 60 from slipping out of place.

Also, in this example embodiment, the pump rotor 54 of the oil pump 50 is arranged radially inward of the bearing 60. However, the arrangement of the oil pump 50 in the axial direction is not limited to this. As long as at least part of the oil pump 50 is arranged radially inward of the bearing 60, then an increase in the overall length of the transaxle can be suppressed. That is, the oil pump 50 can be arranged while suppressing an increase in the size of the power transmitting apparatus 100.

Next, a modified example of the example embodiment will be described.

In the example embodiment described above (see FIG. 4), the bearing 60 is provided on the outer peripheral portion of the cylindrical portion 222a. Instead however, the bearing 60 may be provided on the inner peripheral portion of the cylindrical portion 222a. That is, a support portion of the partition wall 79 that supports the bearing 60 may be provided radially inward of the cylindrical portion 222a, and the bearing 60 may be provided between the outer peripheral portion of the support portion and the inner peripheral portion of the cylindrical portion 222a. In this case, the oil pump 50 is arranged radially inward of the support portion, as well as radially inward of the bearing 60.

The invention claimed is:

1. A power transmitting apparatus comprising:
    an electric motor shaft that is connected to a rotor of an electric motor which serves as one driving source of a vehicle;
    an input shaft which is arranged parallel to the electric motor shaft and transmits power to and from an internal combustion engine which serves as another driving source and is positioned on one side in the axial direction;
    an input shaft rotating member which is provided on an end portion of the input shaft that is on the side opposite the internal combustion engine side and which transmits at least one of the power from the input shaft or the power from the electric motor shaft to a drive shaft of the vehicle;
    a pump which has a pumping apparatus that is driven by the power from the internal combustion engine and pumps lubrication oil, and a pump main body that houses the pumping apparatus; and
    a case that houses the input shaft and the input shaft rotating member, the electric motor being arranged on the opposite side of the input shaft rotating member from the internal combustion engine in the axial direction, wherein
    the pumping apparatus includes a rotating shaft which is coupled to the input shaft and rotatably driven by the power from the internal combustion engine, and a pump rotor which is coupled to the rotating shaft, rotates together with the rotating shaft, and pumps the lubrication oil; and
    the input shaft rotating member is rotatably supported by the case via a bearing, and at least part of the pump rotor is arranged radially inward of the bearing in a same plane perpendicular to the rotating shaft.

2. The power transmitting apparatus according to claim 1, wherein
    the input shaft rotating member includes a rotating member main body, and a gear portion which is formed on an outer peripheral portion of the rotating member main body and is in mesh with the electric motor shaft;
    a rotating member hole portion, which is a hole portion that extends in the axial direction and opens toward the side opposite the internal combustion engine side, is formed in the rotating member main body; and
    a portion of the rotating member main body in which the rotating member hole portion is formed is supported by the bearing, and the pump is arranged in the rotating member hole portion.

3. The power transmitting apparatus according to claim 1, wherein
    the pump main body includes:
        a rotor chamber that houses the pump rotor,
        a pump main body hole portion which is a hole portion that is connected to the rotor chamber and passes in the axial direction through the pump main body on the internal combustion engine side of the rotor chamber, and in which the rotating shaft is arranged,
        a passage for the lubrication oil, which is formed in the axial direction in a position between the pump main body hole portion and an outer peripheral portion of the pump main body in the radial direction, and
        a wall portion that separates the pump main body hole portion and the passage in the radial direction;
    the rotating shaft has an annular protruding portion that protrudes in the radial direction;
    the protruding portion is sandwiched between the wall portion and the pump rotor in the axial direction; and
    an outer peripheral portion of the protruding portion is in the same position in the radial direction as a surface of the wall portion that is on the passage side.

4. The power transmitting apparatus according to claim 1, wherein the pump main body includes a pump body which is a container that houses the pumping apparatus and has an open portion, and a pump cover that covers the open portion; and a positioning member that positions the pump cover with respect to the pump body also serves as a positioning member that positions the pump main body with respect to the case.

5. The power transmitting apparatus according to claim 1, wherein the pump main body has a restricting member which opposes a side face of the bearing and restricts movement of the bearing in the axial direction.

6. A power transmitting apparatus assembly method for assembling the power transmitting apparatus according to claim 1, comprising:
   a first step of pre-assembling the pumping apparatus and the pump main body as an integrated component part; and
   a second step of assembling the component part to the case after the first step has been performed.

7. The power transmitting apparatus assembly method according to claim 6, further comprising:
   a third step of assembling the input shaft to the component part, the third step being performed after the second step has been performed.

* * * * *